US012803152B2

(12) United States Patent
Hong et al.

(10) Patent No.: US 12,803,152 B2
(45) Date of Patent: Nov. 17, 2026

(54) COMMUNICATION DEVICE AND PORTABLE TERMINAL

(71) Applicants: CORNING INCORPORATED, Corning, NY (US); POSTECH RESEARCH AND BUSINESS DEVELOPMENT FOUNDATION, Gyeongsangbuk-do (KR)

(72) Inventors: Won-bin Hong, Gangnam-gu (KR); Byounggwan Kang, Seoul (KR); Youngno Youn, Pohang-si (KR)

(73) Assignees: CORNING INCORPORATED, Corning, NY (US); POSTECH Research and Business Development Foundation, Gyeongsangbuk-Do (CN)

( * ) Notice: Subject to any disclaimer, the term of this patent is extended or adjusted under 35 U.S.C. 154(b) by 39 days.

(21) Appl. No.: 18/944,191

(22) Filed: Nov. 12, 2024

(65) Prior Publication Data

US 2025/0070456 A1 Feb. 27, 2025

Related U.S. Application Data

(62) Division of application No. 17/623,926, filed as application No. PCT/US2020/040408 on Jul. 1, 2020, now Pat. No. 12,166,268.

(30) Foreign Application Priority Data

Jul. 5, 2019 (KR) ........................ 10-2019-0081595
Feb. 6, 2020 (KR) ........................ 10-2020-0014348

(51) Int. Cl.

*H01Q 1/24* (2006.01)
*H01Q 1/52* (2006.01)
*H01Q 15/00* (2006.01)

(52) U.S. Cl.

CPC ............. *H01Q 1/243* (2013.01); *H01Q 1/245* (2013.01); *H01Q 1/52* (2013.01); *H01Q 15/0013* (2013.01)

(58) Field of Classification Search

CPC .......... H01Q 1/24; H01Q 1/243; H01Q 1/245; H01Q 1/38; H01Q 1/52; H01Q 15/00;
(Continued)

(56) References Cited

U.S. PATENT DOCUMENTS 7,151,507 B1 12/2006 Herting
7,315,286 B2 * 1/2008 Lee .......................... H01Q 1/38 343/702
(Continued)

OTHER PUBLICATIONS

Gustafson et al., "Characterization of 60 GHz shadowing by human bodies and simple phantoms", 6th European Conference on Antennas and Propagation (EUCAP), 2012, pp. 473-477.
(Continued)

*Primary Examiner* — Tho G Phan
(74) *Attorney, Agent, or Firm* — Svetlana Z. Short

(57) ABSTRACT

A wireless communication device includes at least one antenna configured to transmit or receive a signal, and a frequency selection surface arranged adjacent to the at least one antenna and configured to diffract the signal generated from the at least one antenna, wherein the frequency selection surface includes a transparent substrate on which a plurality of unit cells are defined, and a plurality of conductive patterns arranged in the plurality of unit cells, respectively.

7 Claims, 16 Drawing Sheets

(58) Field of Classification Search
CPC .. H01Q 15/0013; H01Q 15/002; H01Q 15/14; H01Q 9/04; H01Q 9/0407
See application file for complete search history.

(56) References Cited

U.S. PATENT DOCUMENTS

| | | | | |
|---|---|---|---|---|
| 8,344,952 | B2 * | 1/2013 | Yi | H01Q 7/08 343/702 |
| 9,728,840 | B2 * | 8/2017 | Shi | H01Q 1/243 |
| 10,116,059 | B2 | 10/2018 | Kim et al. | |
| 10,483,649 | B2 | 11/2019 | Cohen | |
| 10,819,007 | B2 * | 10/2020 | Yashiro | G06F 3/041 |
| 10,840,606 | B2 | 11/2020 | Cohen | |
| 11,316,246 | B2 * | 4/2022 | Yamagishi | H01Q 1/22 |
| 11,848,488 | B2 | 12/2023 | Oh et al. | |
| 12,327,917 | B2 * | 6/2025 | Jung | H01Q 9/28 |
| 12,374,779 | B2 * | 7/2025 | Huh | G02F 1/1333 |
| 2013/0088408 | A1 | 4/2013 | Sim | |

OTHER PUBLICATIONS

Howell et al., "Paraxial ray optics cloaking.", Optics express, vol. 22, No. 24 , 2014, pp. 29465-29478.
International Search Report and Written Opinion of the International Searching Authority; PCT/US2020/040408; dated Sep. 21, 2020; 11 pages; European Patent Office.
Junho, et al. "An Optically Invisible Antenna-on-Display (AoD) Concept for Millimeter-wave 5G Cellular Devices." IEEE Transactions on Antennas and Propagation, 2019, 12 pages.
Mikko et al., "Finger effect on 60 GHz user device antennas", 2016 10th European Conference on Antennas and Propagation (EUCAP), European Association of Antennas and Propagation, Apr. 10, 2016, pp. 1-5.
Naser, et al. "A switchable 3-D-coverage-phased array antenna package for 5G mobile terminals." IEEE Antennas and Wireless Propagation Letters, vol. 15, 2016, pp. 1747-1750.
Schurig, David, et al. "Metamaterial electromagnetic cloak at microwave frequencies." Science, vol. 314, 5801, 2006, pp. 977-980.

* cited by examiner

COMMUNICATION DEVICE AND PORTABLE TERMINAL

CROSS-REFERENCE TO RELATED APPLICATION

The application is a divisional application of U.S. application Ser. No. 17/623,926 filed on Dec. 30, 2021, which claims the benefit of priority under 35 U.S.C. § 371 of International Application No. PCT/US2020/040408, filed on Jul. 1, 2020, which claims the benefit of priority under 35 U.S.C. § 119 of Korean Patent Application Serial No. 10-2020-0014348 filed on Feb. 6, 2020, which claims the benefit of priority under 35 U.S.C. § 119 of Korean Patent Application Serial No. 10-2019-0081595 filed on Jul. 5, 2019 the content of which is relied upon and incorporated herein by reference in its entirety.

BACKGROUND

1. Field

The inventive concept relates to a communication device and a portable terminal, and more particularly, to a communication device and a portable terminal which operate in a high-frequency environment and include a frequency selection surface (FSS).

2. Description of Related Art

The new generation of services in wireless network services has introduced new functions to customers and industry. Specifically, mobile phone services and text messages were introduced in 1st generation (1G) communication services and 2nd generation (2G) communication services, respectively, an online access platform using smartphones was established in 3rd generation (3G) communication services, and today's fast wireless networks have been made possible with 4th generation (4G) communication services. However, 4G communication services show functional limitations in terms of ultra-low delay and ultra-fast connection.

5G communication services are expected to handle 1000 times more data traffic and be 10 times faster than 4G communication services, and are expected to be the foundation of various next-generation technologies such as virtual reality, augmented reality, autonomous driving, and Internet of things.

SUMMARY

The inventive concept provides a communication device with improved communication quality.

However, the technical goal of the inventive concept is not limited thereto, and other technical goals may be apparent from the following description.

Additional aspects will be set forth in part in the description which follows and, in part, will be apparent from the description, or may be learned by practice of the presented embodiments of the disclosure.

According to one or more embodiments, a wireless communication device is provided. The wireless communication device includes at least one antenna configured to transmit or receive a signal, and a frequency selection surface arranged adjacent to the at least one antenna and configured to diffract the signal generated from the at least one antenna.

The frequency selection surface may include a transparent substrate on which a plurality of unit cells are defined, and a plurality of conductive patterns arranged in the plurality of unit cells, respectively.

The frequency selection surface may overlap the at least one antenna in a first direction perpendicular to an upper surface of the transparent substrate.

The frequency selection surface may diffract the signal to propagate the signal over an external obstacle overlapping the at least one antenna in the first direction.

The plurality of unit cells may constitute a plurality of regions extending in a second direction parallel to an upper surface of the transparent substrate.

The plurality of unit cells included in the same one of the plurality of regions may have the same impedance.

Each of the plurality of unit cells may resonate with the signal of the at least one antenna to become a new signal source.

Each of the plurality of conductive patterns may include a mesh pattern.

A width of each of the plurality of conductive patterns may be equal to or less than 1/20 of a wavelength of the signal.

Second and third direction lengths of the plurality of unit cells, which are parallel to an upper surface of the transparent substrate and are orthogonal to each other, may be about 0.2 to about 0.5 times a wavelength of the signal.

The transparent substrate may constitute a cover glass of a portable terminal.

The frequency selection surface may be transparent in a visible light band.

According to one or more embodiments, a portable terminal is provided. The portable terminal includes at least one antenna transmitting a first radio frequency (RF) signal, a display indicating a processing status of the portable terminal, a transparent substrate covering the display and the at least one antenna, and a plurality of conductive patterns arranged on the transparent substrate.

The plurality of conductive patterns may be configured to receive the first RF signal to generate a second RF signal.

A width of each of the plurality of conductive patterns may be equal to or less than 1/20 of a wavelength of the first RF signal.

The plurality of conductive patterns may diffract the first RF signal such that the first RF signal avoids an obstacle adjacent to the portable terminal.

Each of the plurality of conductive patterns may resonate with the first RF signal.

The at least one antenna may be located in a center portion of the transparent substrate.

The at least one antenna may be located at an edge of the transparent substrate.

The at least one antenna may include a plurality of antennas.

According to one or more embodiments, a communication device is provided. The communication device may include an antenna configured to generate a radio frequency (RF) signal, and a frequency selection surface configured to diffract a signal generated from the antenna with respect to a surrounding obstacle.

The frequency selection surface may include a glass substrate, and conductive patterns arranged in a matrix on the glass substrate.

Each of the conductive patterns may include an adhesive layer for adhering to the glass substrate, and a conductive layer arranged on the adhesive layer.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
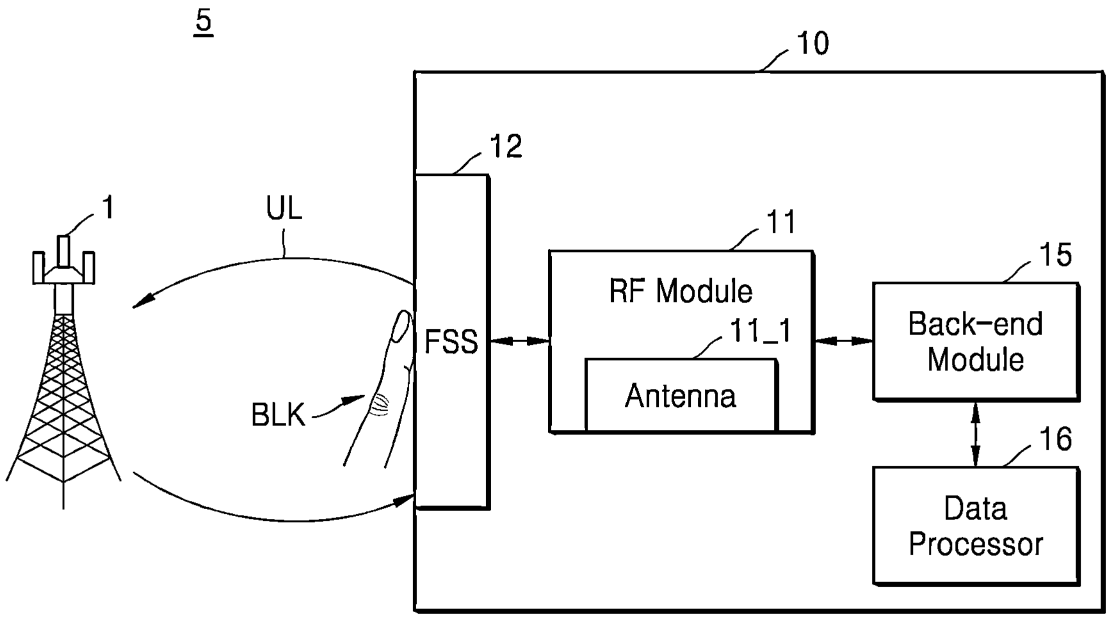
FIG. 1 is a block diagram of a wireless communication system including user equipment, according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

While such terms as "first," "second," etc., may be used to describe various components, such components are not limited to the above terms. The above terms are used only to distinguish one component from another. For example, a first component may indicate a second component or a second component may indicate a first component without conflicting.

The terms used herein in various example embodiments are used to describe example embodiments only, and should not be construed to limit the various additional embodiments. Singular expressions, unless defined otherwise in contexts, include plural expressions. The terms "include", "comprise" or "have" used herein in various example embodiments may indicate the presence of a corresponding function, operation, or component and do not limit one or more additional functions, operations, or components.

Unless otherwise defined, all terms (including technical and scientific terms) used herein have the same meaning as commonly understood by one of ordinary skill in the art to which the disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

When a certain embodiment may be implemented differently, a specific process order may be performed differently from the described order. For example, two consecutively described processes may be performed substantially at the same time or performed in an order opposite to the described order.

FIG. 1 is a block diagram of a wireless communication system 5 including a user equipment 10, according to an example embodiment. The wireless communication system 5 may be, as a non-limiting example, a wireless communication system using a cellular network such as a 5th generation wireless (5G) system, a long term evolution (LTE) system, an LTE-advanced system, a code division multiple access (CDMA) system, or a global system for mobile communications (GSM), or may be a wireless local area network (WLAN) system or any other wireless communication system. In the following, the wireless communication system 5 will be described mainly with reference to a wireless communication system using a cellular network, but it will be understood that example embodiments of the disclosure are not limited thereto.

A base station (BS) 1 may generally refer to a fixed station that communicates with user equipment and/or other base stations, and may communicate data and control information by communicating with user equipment and/or other base stations. For example, the base station 1 may also be referred to as a Node B, an evolved-Node B (eNB), a next generation Node B (gNB), a sector, a site, a base transceiver system (BTS), an access pint (AP), a relay node, a remote radio head (RRH), a radio unit (RU), a small cell, or the like. In this specification, a base station or a cell may be interpreted as a generic meaning representing some area or function that are covered by a base station controller (BSC) in CDMA, a Node-B in WCDMA, an eNB in LTE, a gNB or sector (site) in 5G, and the like, and may cover all the various coverage areas such as megacell, macrocell, microcell, picocell, femtocell, relay node, RRH, RU, and small cell communication ranges.

The user equipment 10 may be fixed or mobile and may refer to any equipment that may communicate with a base station, for example, the base station 1, to transmit and receive data and/or control information thereto or therefrom. For example, the user equipment 10 may be referred to as a terminal, a terminal equipment, a mobile station (MS), a mobile terminal (MT), a user terminal (UT), a subscriber station (SS), a wireless device, a handheld device, or the like. In the following, the example embodiments of the disclosure will be described mainly with reference to the user equipment 10 as a wireless communication device, but it will be understood that the example embodiments of the disclosure are not limited thereto.

A wireless communication network between the user equipment 10 and the base station 1 may support communication between multiple users by sharing available network resources. For example, in the wireless communication network, information may be transmitted in various multiple access schemes such as code division multiple access (CDMA), frequency division multiple access (FDMA), time division multiple access (TDMA), orthogonal frequency division multiple access (OFDMA), single carrier frequency division multiple access (SC-FDMA), OFDM-FDMA, OFDM-TDMA, and OFDM-CDMA. As shown in FIG. 1, the user equipment 10 may communicate with the base station 1 through uplink UL and downlink DL. In some embodiments, user equipments may communicate with each other through sidelinks, such as device-to-device (D2D).

The user equipment 10 may support access to two or more wireless communication systems. For example, the user equipment 10 may access a first wireless communication system and a second wireless communication system, which are different from each other, and the first wireless communication system may use a higher frequency band than the second wireless communication system. For example, the first wireless communication system may be a wireless communication system (e.g., 5G) using a millimeter wave (mmWave), whereas the second wireless communication system may be a wireless communication system (e.g., LTE) using a frequency band that is lower than that of the mmWave. The second wireless communication system may be referred to as a legacy wireless communication system.

In some embodiments, the user equipment 10 may access the first wireless communication system and the second wireless communication system through different base stations. In some embodiments, the user equipment 10 may access the first wireless communication system and the second wireless communication system through one base station, e.g., the base station 1. In addition, in some embodiments, user equipment 10 may support access to three or more different wireless communication systems. As shown in FIG. 1, the user equipment 10 may include a radio frequency (RF) module 11, a frequency selection surface (FSS) 12, a back-end module 15, and a data processor 16. In some embodiments, the back-end module 15 and the data processor 16 may be included in one semiconductor package, or may be respectively included in independent semiconductor packages.

As a non-limiting example, the RF module 11 may include at least one antenna 11_1. The at least one antenna 11_1 may be any one of a patch antenna, a dipole antenna, a monopole antenna, a slot antenna, an inverted F antenna (IFA), and a planar inverted F antenna (PIFA).

The RF module 11 may process a signal received through the antenna 11_1 and a signal to be transmitted through the antenna 11_1. The RF module 11 may receive an RF signal received through the antenna 11_1 to generate an intermediate frequency signal. The RF module 11 may output, through the antenna 11_1, an RF signal generated based on an intermediate frequency signal provided from the back-end module 15.

The RF module 11 may include a front-end RF circuit, a buffer, a switch, and the like. In some embodiments, the user equipment 10 includes the RF module 11 to access the first wireless communication system using a relatively high frequency band, and may also include an additional RF module for accessing the second wireless communication system using a relatively low frequency band.

In frequency bands below about 6 GHZ, linearity of signals are relatively weak and thus communication may be performed in a manner similar to RF communication in the existing 2.5 GHz frequency band. However, signals in high frequency bands such as an mmWave have strong straightness, but have low diffraction. Accordingly, communication quality may be influenced by the interference by an obstacle BLK such as a user's body and/or the direction of the antenna 11-1.

The user equipment 10 may include the FSS 12 arranged in front of the antenna 11_1, in order to enable communication with the base station 1 even if the transmission and reception of signals through the antenna 11_1 are blocked by the obstacle BLK or despite the direction of the user equipment 10. The FSS 12 may diffract a signal transmitted by the antenna 11_1 such that the signal may propagate over the obstacle BLK. The FSS 12 may be a kind of band pass filter (BPF). The back-end module 15 may process or generate a baseband signal. For example, the back-end module 15 may generate an intermediate frequency signal by processing a baseband signal provided from the data processor 16. The back-end module 15 may generate a baseband signal by processing the intermediate frequency signal. The RF module 11 may generate baseband signals and provide them to the data processor 16, and in this case, down conversion and up conversion performed in the back-end module 15 may be omitted.

The data processor 16 may extract information to be transmitted by the base station 1 from a baseband signal S_BB received from the back-end module 15 and may generate the baseband signal S_BB including information to be transmitted to the base station 1.

Figure 2:
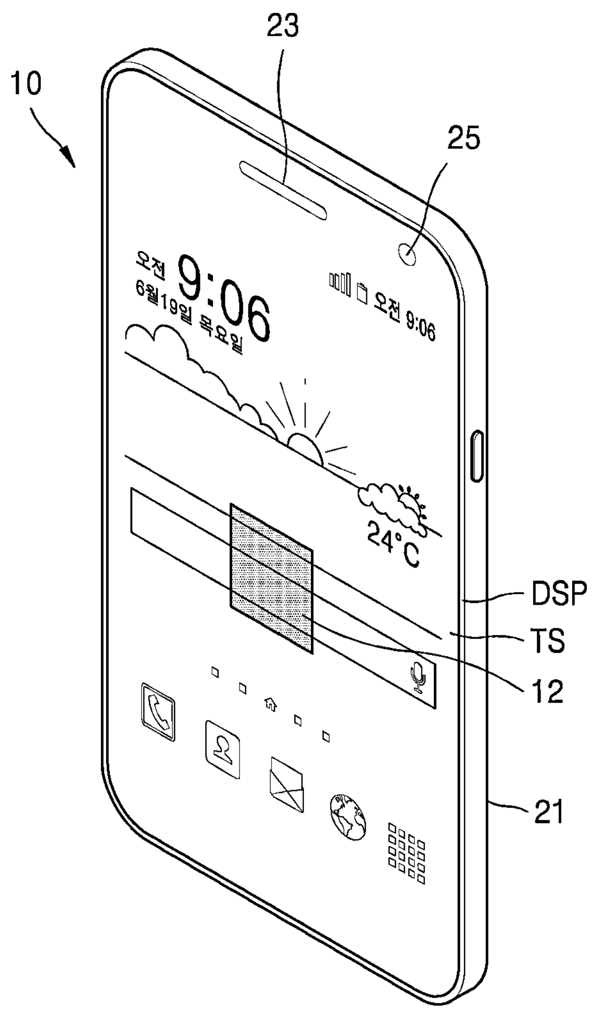
FIG. 2 is a perspective view of user equipment according to example embodiments.

FIG. 2 is a perspective view of a user equipment 10 according to example embodiments.

Referring to FIG. 2, the user equipment 10 may include a housing 21 for forming an exterior and protecting elements therein, a display device DSP for outputting an image, and a transparent substrate TS. The transparent substrate TS may transmit display contents of the display device DSP so that the user may see the display contents, and may also be combined with the housing 21 to protect internal circuits such as the display device DSP. The transparent substrate TS may include an insulating material having high light transmittance, such as glass or polyimide. The user equipment 10 may further include a receiver 23 and a front camera 24.

Figure 3:
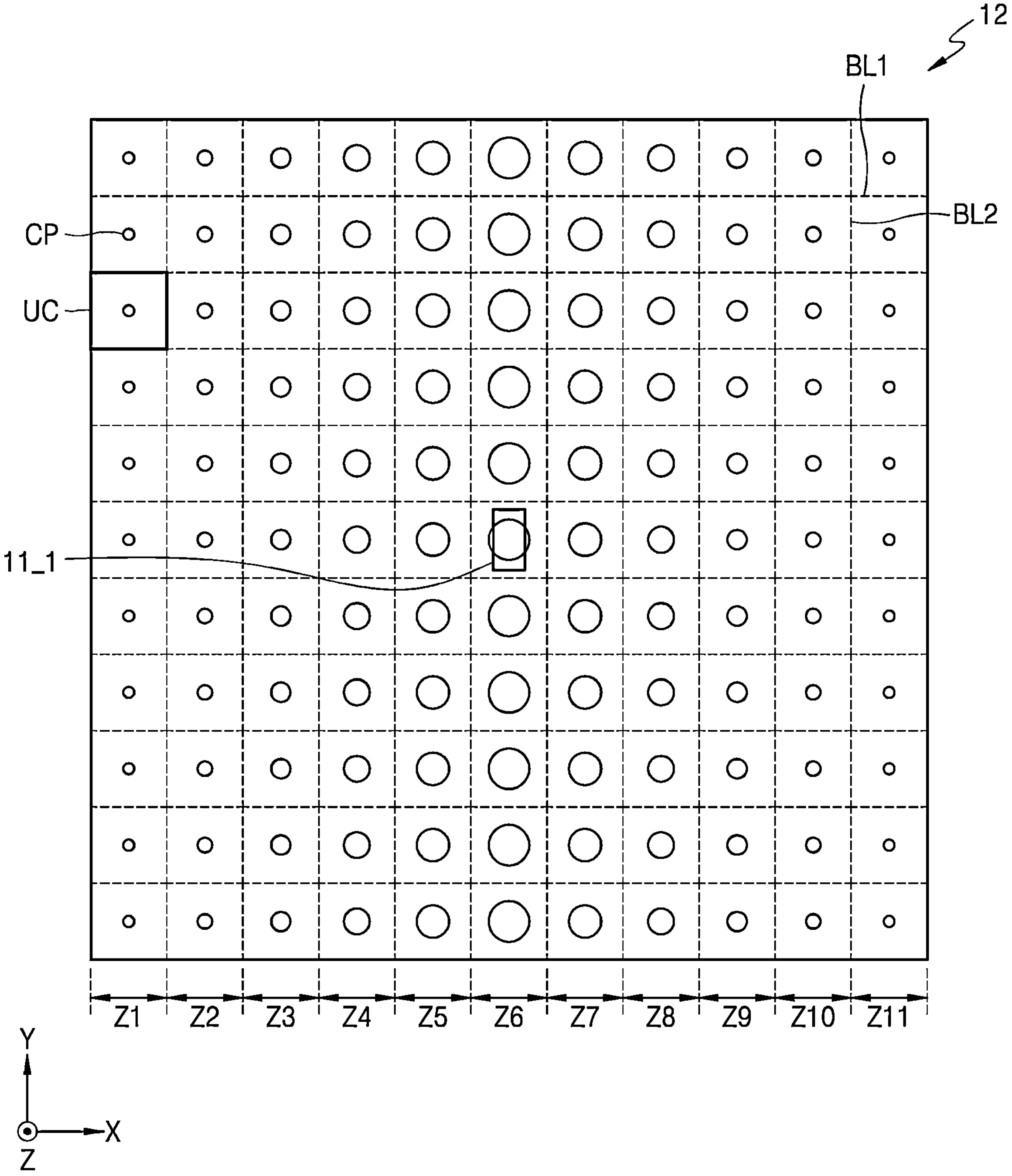
FIG. 3 is a diagram illustrating the layout of a frequency selection surface (FSS) and an antenna.

The FSS 12 may include a portion of the transparent substrate TS and conductive patterns CP (see FIG. 3).

Hereinafter, an example structure of the FSS 12 will be described with reference to FIGS. 3 to 4B.

FIG. 3 is a diagram illustrating the layout of the FSS 12 and the antenna 11_1.

Figure 4A:
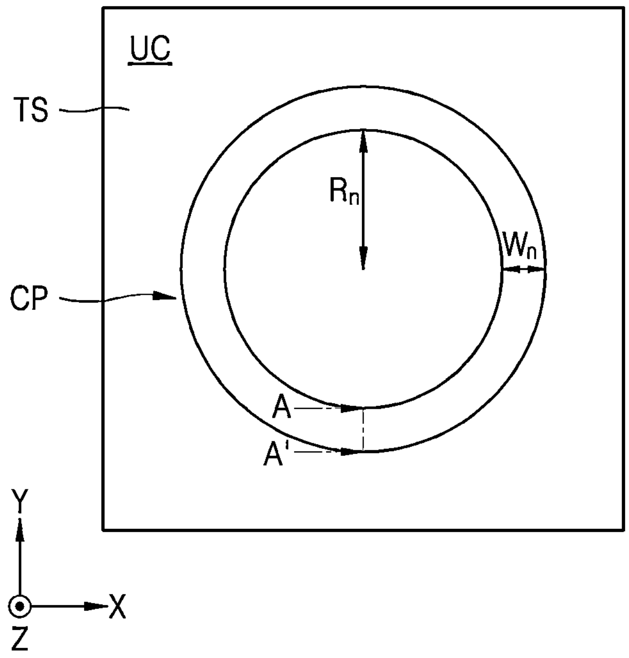
FIG. 4A is an enlarged partial plan view of a unit cell of the FSS of FIG. 3.

FIG. 4A is an enlarged partial plan view of a unit cell UC of the FSS 12 of FIG. 3.

Figure 4B:
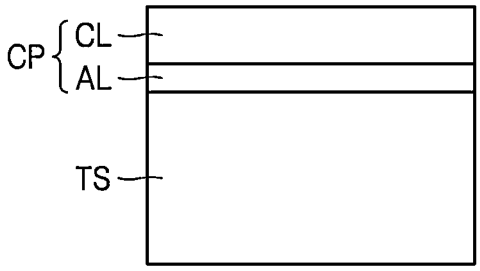
FIG. 4B is a cross-sectional view taken along line A-A' of FIG. 4A.

FIG. 4B is a cross-sectional view taken along line A-A' of FIG. 4A.

FIGS. 3 to 4B, the FSS 12 may include a portion of the transparent substrate TS and a plurality of conductive patterns CP arranged thereon.

Two directions parallel to the upper surface of the transparent substrate TS and substantially perpendicular to each other are defined as X and Y directions, respectively. In addition, a direction substantially perpendicular to the upper surface of the transparent substrate TS is defined as a Z direction. Definitions of the above directions are the same in all the drawings below unless otherwise stated.

In the following description, for convenience of description, the FSS 12 is described based on a case where the FSS 12 is formed on a substantially rectangular area, but this does not limit the technical spirit of the inventive concept in any sense. The planar shape of the FSS 12 may have various shapes, such as a circle, an ellipse, and a polygon, or may include a curved surface.

A pair of edges of the FSS 12 may be parallel to the X direction, and the other pair of edges may be parallel to the Y direction. The FSS 12 may overlap the antenna 11_1 in the Z direction. The antenna 11_1 may overlap a center region of the FSS 12 in the Z direction.

First and second boundary lines BL1 and BL2 are virtual lines defined on the transparent substrate TS. The first boundary lines BL1 are imaginary dividing lines spaced at equal intervals in the Y direction and substantially parallel to the X direction. The second boundary lines BL2 are imaginary dividing lines spaced at equal intervals in the X direction and substantially parallel to the Y direction. Unit cells UC, each of which includes the conductive pattern CP, may be defined on the transparent substrate TS by the first and second boundary lines BL1 and BL2.

Unit cells UC arranged in a matrix in the FSS 12 may be defined, and the conductive pattern CP may be arranged in each of the unit cells UC. In some embodiments, in order to prevent damage of the conductive pattern CP due to an external factor, the conductive pattern CP may be formed on a surface, which faces the inside of the user equipment 10 (see FIG. 2), of both surfaces of the transparent substrate TS. However, the disclosure is not limited thereto.

The conductive pattern CP may include a conductive layer CL and an adhesive layer AL for bonding the conductive layer CL to the transparent substrate TS. The conductive layer CL may include a conductive material such as a metal, a semiconductor material, and a metal compound. The adhesive layer AL may include a metal such as titanium (Ti), but is not limited thereto. Each of the conductive layer CL and the adhesive layer AL may include a transparent electrode material.

The X and Y direction lengths of each of the unit cells UC may depend on the operating frequency of the antenna 11_1. The X and Y direction lengths of the unit cell UC may be about 0.2 to about 0.5 times the wavelength of the RF signal generated by the antenna 11_1. However, the disclosure is not limited thereto, and the distance between the first boundary lines BL1 and the distance between the second boundary lines BL2 may be different from each other, and thus, the X direction length of the unit cell UC may be different from the Y direction length of the unit cell UC.

In some embodiments, one conductive pattern CP may be formed in each unit cell U. In some embodiments, the conductive pattern CP may be formed on one surface or both surfaces of the transparent substrate TS.

In some embodiments, the conductive pattern CP may be ring-shaped when viewed in the Z direction, that is, when viewed from above, but is not limited thereto. In some embodiments, a portion of the transparent substrate TS exposed and surrounded by the conductive pattern CP may be approximately circular, but is not limited thereto. For example, the conductive pattern CP may have various shapes such as a hollow ellipse, a hollow triangle, a hollow rectangle, a hollow polygon, a cross, a straight line, a star, and the like, when viewed from above.

The center of the conductive pattern CP may coincide with the center of the unit cell UC. In some embodiments, the transparent substrate TS surrounded and exposed by the conductive pattern CP may be approximately circular, but is not limited thereto.

In some embodiments, the widths of each of the conductive patterns CP in the first and second directions (X direction and Y direction) may be substantially equal to each other. In some embodiments, a width $W_n$ of the conductive pattern CP may be about 1/20 of the wavelength of the RF signal generated by the antenna 11_1. In some embodiments, the width Wn of the conductive pattern CP may be about 1/20 or less of the wavelength of the RF signal generated by the antenna 11_1.

In some embodiments, the thickness (i.e., Z direction height) of the conductive layer CL may be about 50 Å to about 3000 Å. In some embodiments, the Z direction height of the conductive layer CL may be about 100 Å to about 2000 Å. The thickness (i.e., Z direction height) of the adhesive layer AL may be about 10 Å to about 100 Å. In some embodiments, the Z direction height of the conductive layer CL may be about 20 Å to about 50 Å.

The conductive patterns CP arranged in a matrix may be interpreted as an LC resonant circuit and may serve as a resonator. The FSS 12 may be transparent to visible light. The FSS 12 may transmit electromagnetic waves in the visible light band without substantially interacting with the electromagnetic waves in the visible light band. In some embodiments, the transmittance of the FSS 12 of the electromagnetic waves in the visible light band may be about 70% or more. In some embodiments, the transmittance of the FSS 12 of the electromagnetic waves in the visible light band may be about 80% or more.

In some embodiments, a plurality of unit cells UC may constitute first to eleventh regions Z1 to Z11. The first to eleventh regions Z1 to Z11 may extend in the Y direction, respectively. In some embodiments, the sizes of conductive patterns CP included in the same region among the first to eleventh regions Z1 to Z11 may be substantially the same.

In some embodiments, conductive patterns CP arranged in the first and eleventh regions Z1 and Z11 from among the patterns CP included in the first to eleventh regions Z1 to Z11 may be the smallest. In some embodiments, the sizes of the conductive patterns CP arranged in the first and eleventh regions Z1 and Z11 may be substantially the same.

In some embodiments, the sizes of conductive patterns CP arranged in the second and tenth regions Z2 and Z10 may be greater than the sizes of the conductive patterns CP arranged in the first and eleventh regions Z1 and Z11. In some embodiments, the sizes of the conductive patterns CP arranged in the second and tenth regions Z2 and Z10 may be substantially the same.

In some embodiments, the sizes of conductive patterns CP arranged in the third and ninth regions Z3 and Z9 may be greater than the sizes of the conductive patterns CP arranged in the second and tenth regions Z2 and Z10. In some embodiments, the sizes of conductive patterns CP arranged in the third and ninth regions Z3 and Z9 may be substantially the same.

In some embodiments, the size of conductive patterns CP arranged in the fourth and eighth regions Z4 and Z8 may be greater than the sizes of the conductive patterns CP arranged in the third and ninth regions Z3 and Z9. In some embodiments, the sizes of conductive patterns CP arranged in the fourth and eighth regions Z4 and Z8 may be substantially the same.

In some embodiments, the sizes of conductive patterns CP arranged in the fifth and seventh regions Z5 and Z7 may be greater than the sizes of the conductive patterns CP arranged in the fourth and eighth regions Z4 and Z8. In some embodiments, the sizes of the conductive patterns CP arranged in the fifth and seventh regions Z5 and Z7 may be substantially the same.

In some embodiments, the conductive patterns CP arranged in the sixth region Z6 from among the patterns CP included in the first to eleventh regions Z1 to Z11 may be the largest. In some embodiments, the sizes of the conductive patterns CP arranged in the fourth and eighth regions Z4 and Z8 may be substantially the same.

The inner radii of conductive patterns CP included in the nth region (in this embodiment, n is a natural number of 1 to 11) are defined as Rn, and the widths of the conductive patterns CP included in the nth region are defined as Wn.

In this case, the inner radii Rn may satisfy Equation 1 below.

$$R6>R5=R7>R4=R8>R3=R9>R2=R10>R1=R11 \quad \text{[Equation 1]}$$

In some embodiments, the widths Wn of the conductive patterns CP included in the nth region may be substantially equal to each other, but are not limited thereto.

Referring back to FIGS. 1 and 3, each of the plurality of conductive patterns CP included in the FSS 12 may resonate with a signal transmitted to the antenna 12_1. Accordingly, the plurality of conductive patterns CP may be a new wave source by resonating with the signal of the antenna 12_1. Accordingly, each of the conductive patterns CP may be a new wave source, and a result signal obtained by the superposition of signals caused by the conductive patterns CP may avoid the obstacle BLK and propagate to the base station 1, an adjacent repeater, or the like. Accordingly, high quality communication may be performed even when there is an obstacle BLK in communication environment.

Figure 5:
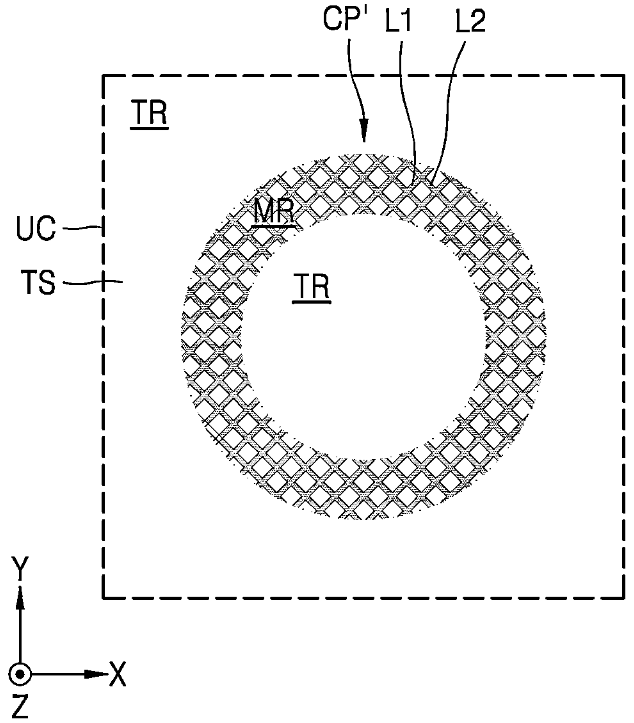
FIG. 5 is a partial plan view of a unit cell according to some other embodiments.

FIG. 5 is a partial plan view of a unit cell UC according to some other embodiments.

Referring to FIG. 5, conductive patterns CP' may be formed in a mesh structure. A portion in which the mesh structure is formed in the unit cell U is defined as a mesh region MR, and a portion in which the mesh structure is not formed is defined as a transparent region TR.

In some embodiments, the mesh region MR of FIG. 5 may be ring-shaped when viewed from above, similar to the conductive patterns CP shown in FIG. 4A. The mesh structure of the conductive patterns CP' may be formed by a plurality of first and second conductive lines L1 and L2 extending in an oblique direction with respect to each of the X and Y directions. A transparent substrate TS surrounded and exposed by the first and second conductive lines L1 and L2 may have a diamond shape.

In some embodiments, by providing the conductive patterns CP' having the mesh structure, the ratio of the conductive patterns CP' in the space where the FSS 12 (see FIG. 2) is defined is reduced, and thus, the visibility of the conductive patterns CP' may be lowered. Accordingly, even when a portion of the transparent substrate TS covering the display device DSP (see FIG. 2) of the user equipment 10 (see FIG. 2) constitutes the FSS 12 (see FIG. 2), the conductive patterns CP' are not easily visually recognized, and thus, the quality of a user experience may be improved.

FIGS. 6A to 9B are diagrams illustrating experimental examples for explaining the effect of the inventive concept.

Figure 6A:
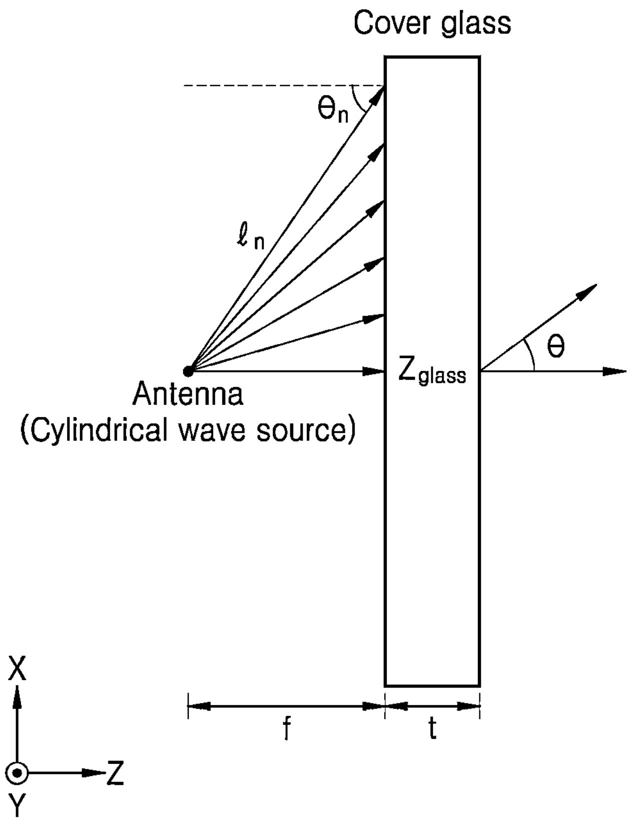
FIGS. 6A to 9B are diagrams illustrating experimental examples for explaining the effect of the inventive concept.
Figure 6B:
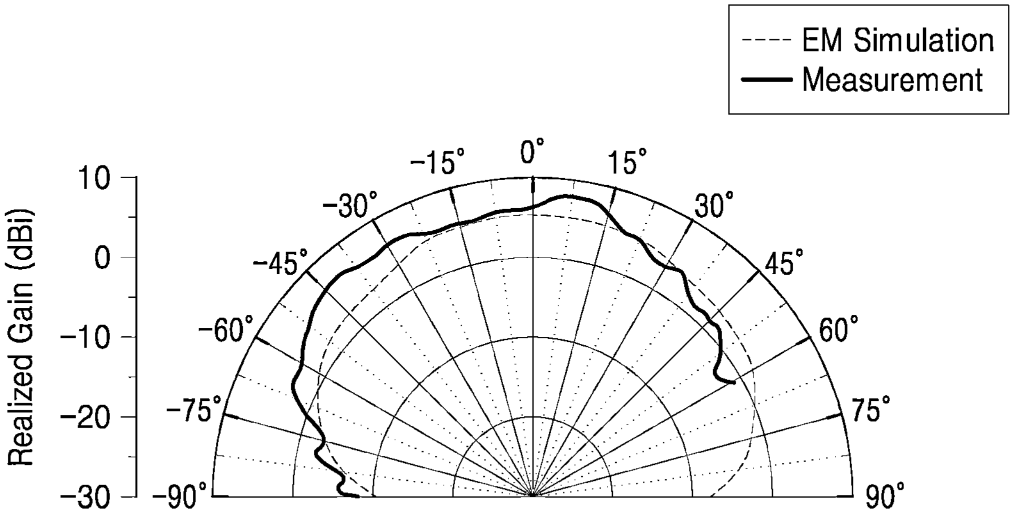
Figure 6C:
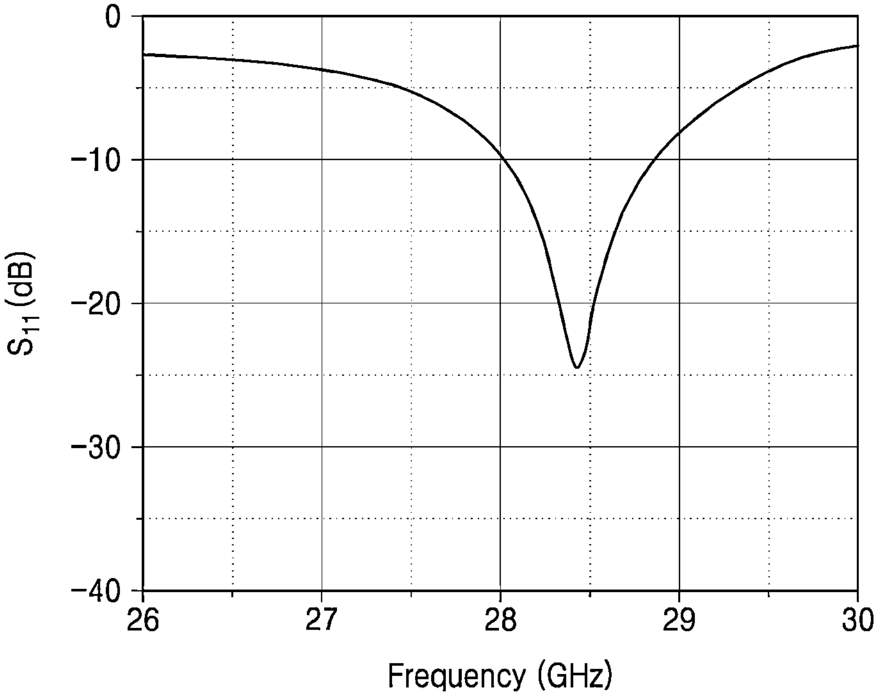
Figure 7A:
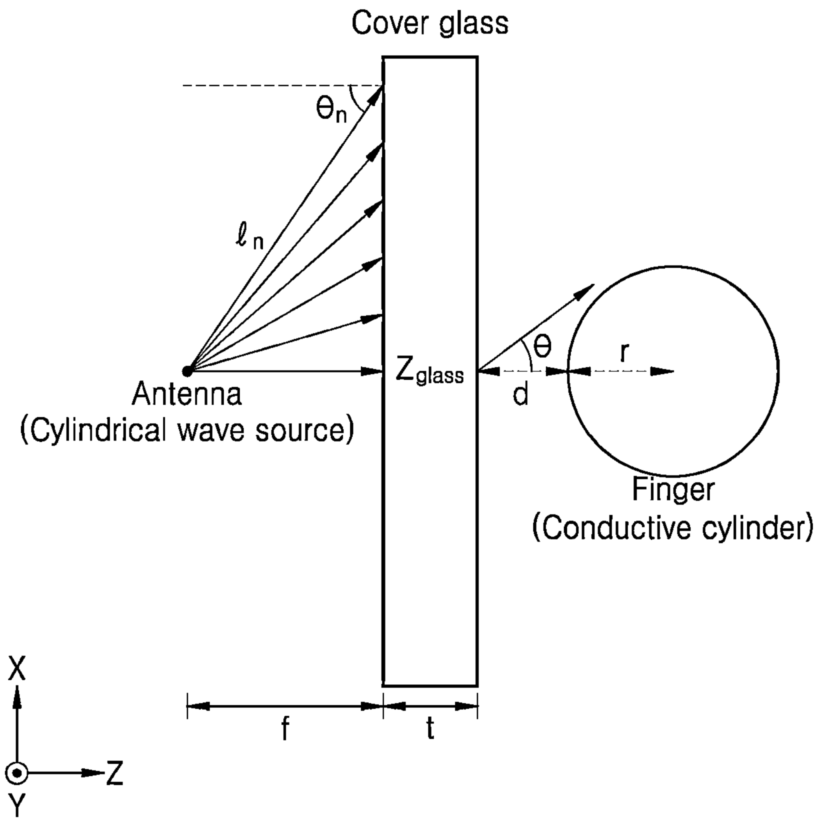
Figure 7B:
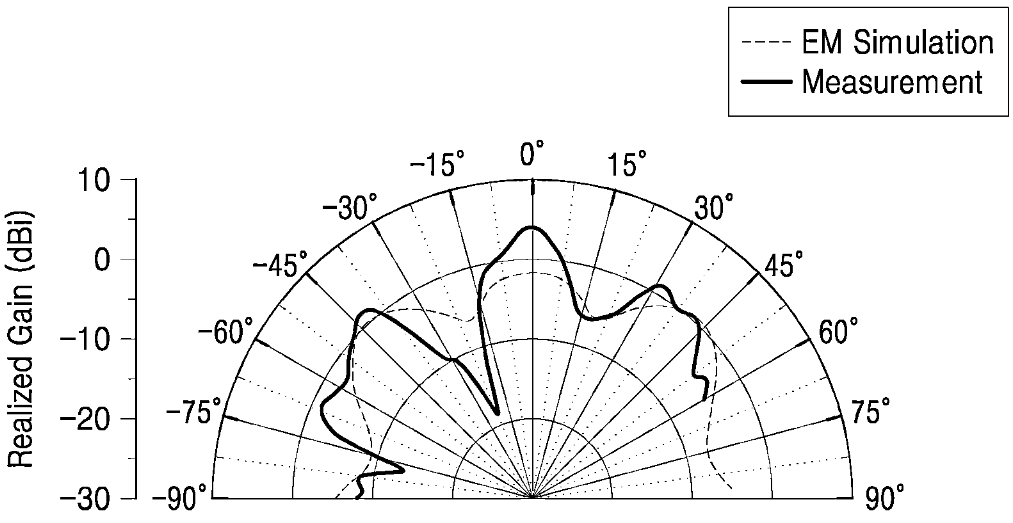
Figure 7C:
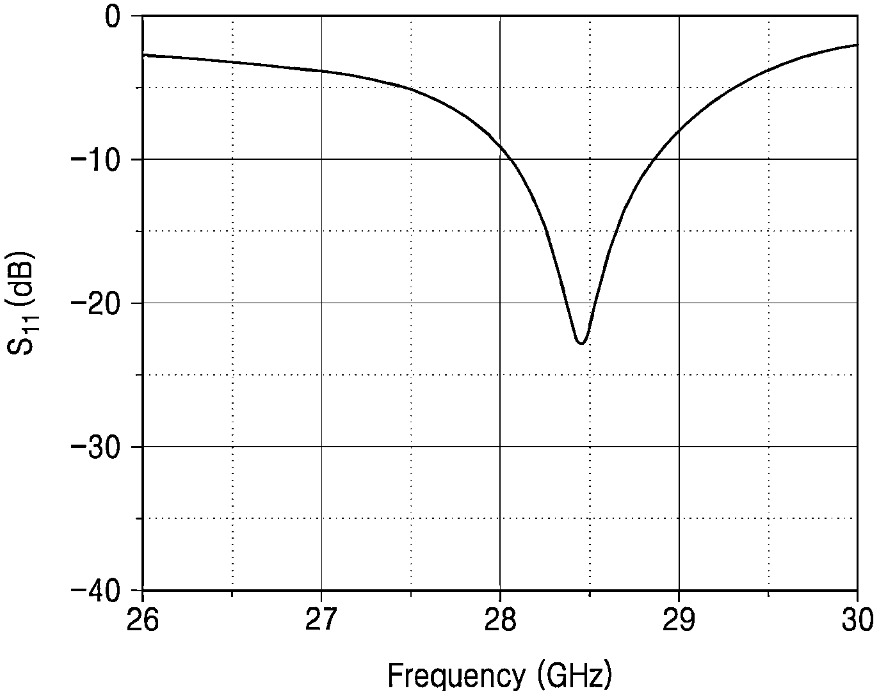
Figure 8A:
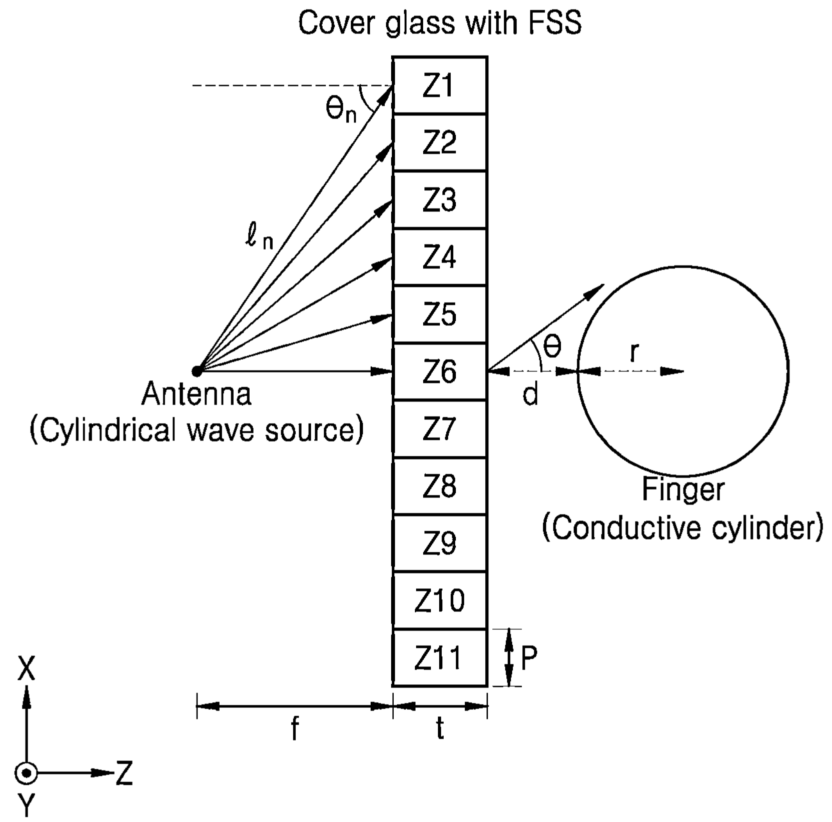

More specifically, FIGS. 6A, 7A, and 8A are diagrams for explaining the configuration of each experimental example, and FIGS. 6B, 7B, 8B, and 9A are graphs showing a gain of a transmitted wave to an incident wave according to azimuth angles. FIGS. 6C, 7C, 8C, and 9B show an S11 component of a scattering coefficient for each frequency and show an insertion loss.

Referring to FIG. 6A, in a first experimental example, only an antenna and a cover glass were provided. The antenna may generate an RF signal in the range of at least about 26 GHz to about 30 GHz. The cover glass is a bare cover glass which is not provided with the FSS 12 described with reference to FIGS. 3 to 5, and may have a thickness t of about 0.5 mm. The Gorilla Glass of Corning Precision Materials Co., Ltd. was used as the cover glass. A distance f between the antenna and the cover glass was about 6 mm.

In the first experimental example, a signal transmission gain according to a polar angle θ with respect to the outer surface of the cover glass was measured. The measured signal transmission gain is shown in FIG. 6B. In addition, in the first experimental example, the insertion loss was measured while changing the frequency of a signal generated by the antenna. The measured insertion loss is shown in FIG. 6C.

In FIG. 6B, the solid line shows a gain according to the measurement in the first experimental example, and the broken line shows a simulation result for the first experimental example. In a region where the polar angle θ was about 60° to about 90°, an antenna cable was arranged and measurement was not performed, and in a region where the polar angle θ was about 0° to about 60°, a signal was partially distorted. The same applies to the second to fourth experimental examples. Referring to FIG. 6B, it may be confirmed that a separate obstacle is not arranged and thus a gain according to the polar angle θ) is relatively uniform.

Referring to FIG. 6C, in the first experimental example, a resonant frequency was about 28.42 GHZ, a bandwidth was about 28.00 GHz to about 28.86 GHZ, and a gain at the resonant frequency measured at a polar angle of 0° was about 6.41 dB.

Referring to FIG. 7A, in a second experimental example, an obstacle is provided in addition to the antenna and the cover glass of the first experimental example. The obstacle is implemented by a conductive cylinder having a radius of about 5 mm by approximating a user's finger, and a distance d between the cover glass and the obstacle is 2.0 mm. At least a portion of the obstacle is arranged at a position overlapping the antenna in the Z direction.

As in the first experimental example, a gain according to the polar angle θ of the cover glass was measured. The measured gain is shown in FIG. 7B. Also, the insertion loss was measured while changing the frequency of a signal generated by the antenna. The measured insertion loss is shown in FIG. 7C.

In FIG. 7B, the solid line shows a gain according to the measurement in the second experimental example, and the broken line shows a simulation result for the second experimental example. Referring to FIG. 7B, the second experimental example shows gain characteristics in which the gain is not uniform depending on the polar angle θ due to the arrangement of the conductive cylinder that is an obstacle.

Referring to FIG. 7C, in the second experimental example, a resonant frequency was about 28.45 Hz, a bandwidth was about 28.05 GHz to about 28.86 GHZ, and a gain at the resonant frequency measured at a polar angle of 0° was 3.43 dB. Accordingly, it was confirmed that a loss of about 2.98 dB occurred due to the obstacle at the polar angle of 0°.

Referring to FIG. 8A, in a third experimental example, an FSS is formed on the cover glass, unlike in the second experimental example. The FSS may have a structure similar to that shown in FIG. 3, and thus, a plurality of regions Z1 to Z11 parallel to the Y direction may be defined. In the third experimental example, the width of each of the conductive patterns constituting the FSS is about 100 μm. The width of each of the conductive patterns is defined in the same manner as shown in FIG. 4A.

A period p between the regions Z1 to Z11 may be about 5 mm. That is, based on the unit cells UC shown in FIG. 3, the lengths of each of the unit cells UC in the X and Y directions may be about 5 mm. Impedances of conductive patterns included in the regions Z1 to Z11 are indicated as Z1 to Z11. The FSS of the third experimental example may be characterized by Table 1 below.

TABLE 1

| Zone (#) | Path length (mm) | Incident angle (deg) | Impedance (ohm) | Insertion loss (dB) | Phase (deg) |
|---|---|---|---|---|---|
| 1, 11 | 26.92 | 68 | 48.46 − j89.96 | −2.2 | −103 |
| 2, 10 | 22.36 | 63 | 95.65 + j17.59 | −1.6 | −166 |
| 3, 9 | 18.02 | 56 | 197.25 − j66.63 | −1.4 | −12 |
| 4, 8 | 14.14 | 45 | 88.55 + j98.71 | −0.6 | −113 |
| 5, 7 | 11.18 | 26 | 102.3 − j13.06 | −1.2 | −190 |
| 6 | 10.00 | 0 | 108.14 − j30.18 | −0.8 | −202 |

In Table 1, 'Zone(#)' represents an ordinal number indicating a region on the FSS 12. 'Path length(mm)' represents the distance from the antenna to each of the regions Z1 to Z11, and 'Incident angle' represents the angle between the Z direction and a vector connecting the antenna to each of the first to eleventh regions Z1 to Z11. 'Insertion loss' represents the magnitude ratio of a transmitted wave to an incident wave in decibels immediately after a signal passes through each of the first to eleventh regions Z1 to Z11, and 'Phase angle' represents the phase change of a signal generated as the signal progresses on a path length.

Figure 8B:
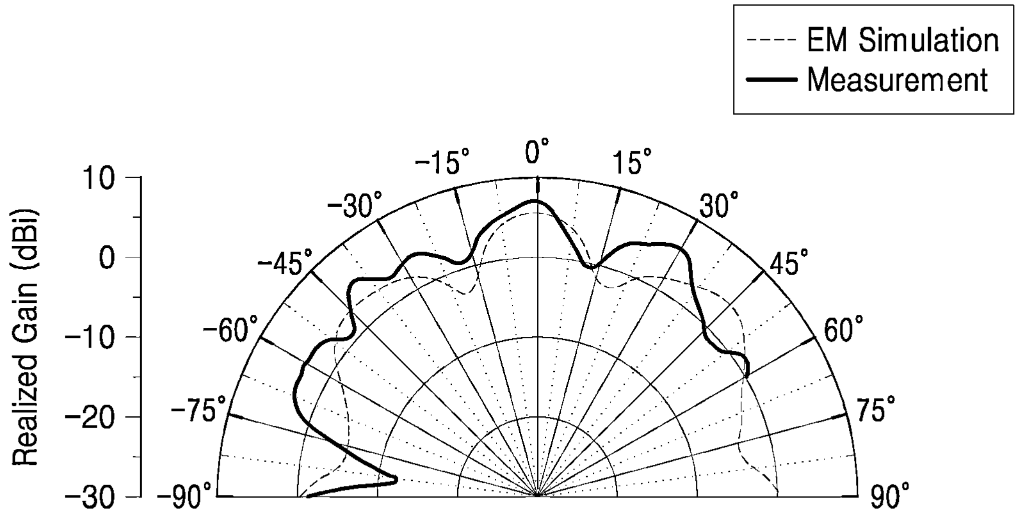

In FIG. 8B, the solid line shows a gain according to the measurement in the third experimental example, and the broken line shows a simulation result for the third experimental example. Referring to FIG. 8B, the third experimental example shows relatively even polar angle gain distribution characteristics compared to the second experimental example.

Figure 8C:
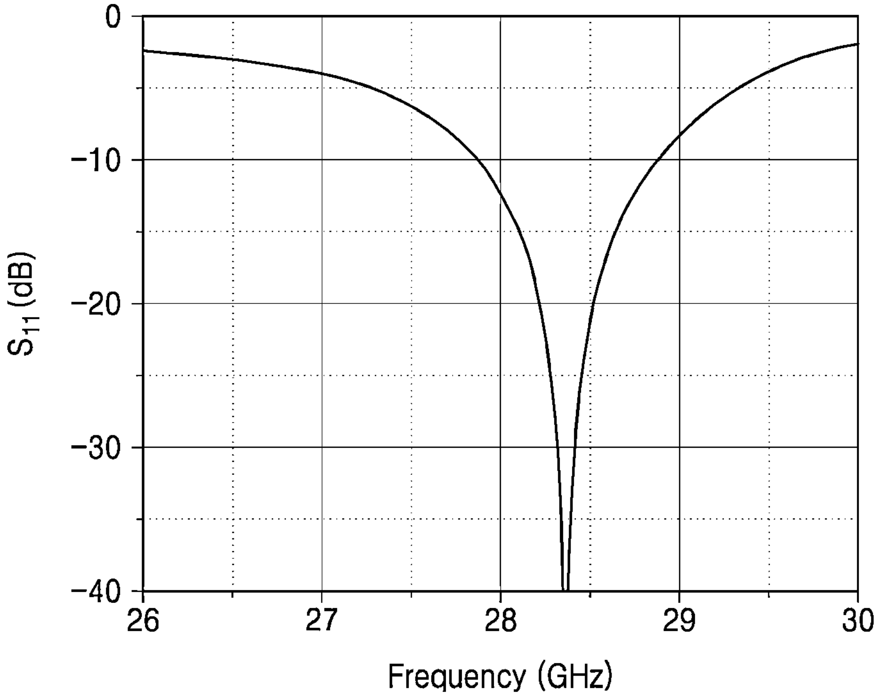

Referring to FIG. 8C, in the second experimental example, a resonant frequency was about 28.36 Hz, a bandwidth was about 27.87 GHz to about 28.89 GHZ, and a gain at the resonant frequency measured at a polar angle of 0° was 6.47 dB. Accordingly, it was confirmed that a loss due to the obstacle was compensated by 3.04 dB at the polar angle of 0°.

The configuration of a fourth experimental example is the same as that shown in FIG. 8A, and unlike the third experimental example, the width of each of the conductive patterns constituting the FSS is about 10 μm. In the fourth experimental example, the radius of a conductive pattern for each region was determined based on the impedance for each region which is the same as that of the third experimental example.

Figure 9A:
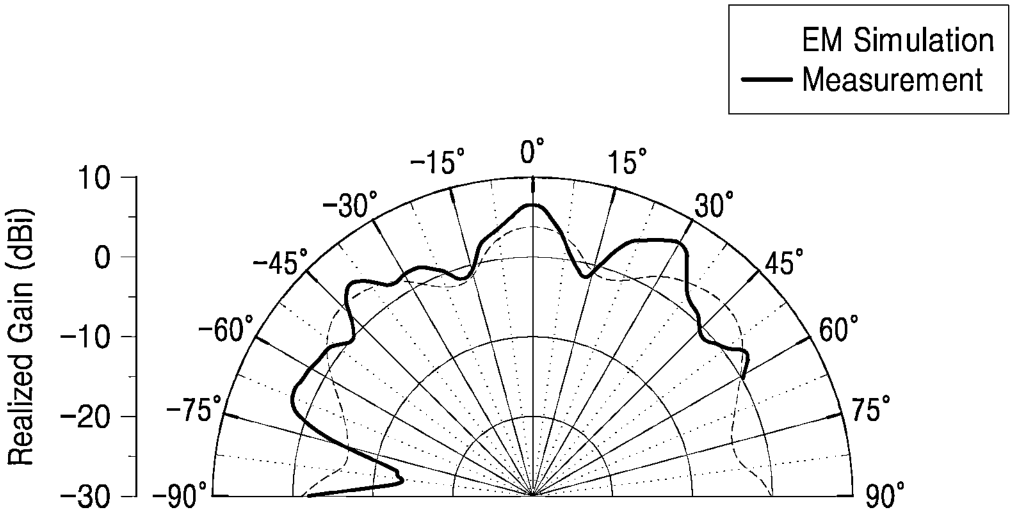

In FIG. 9A, the solid line shows a gain according to the measurement in the fourth experimental example, and the broken line shows a simulation result for the fourth experimental example. Referring to FIG. 9A, the fourth experimental example shows relatively even polar angle gain distribution characteristics compared to the second experimental example.

Figure 9B:
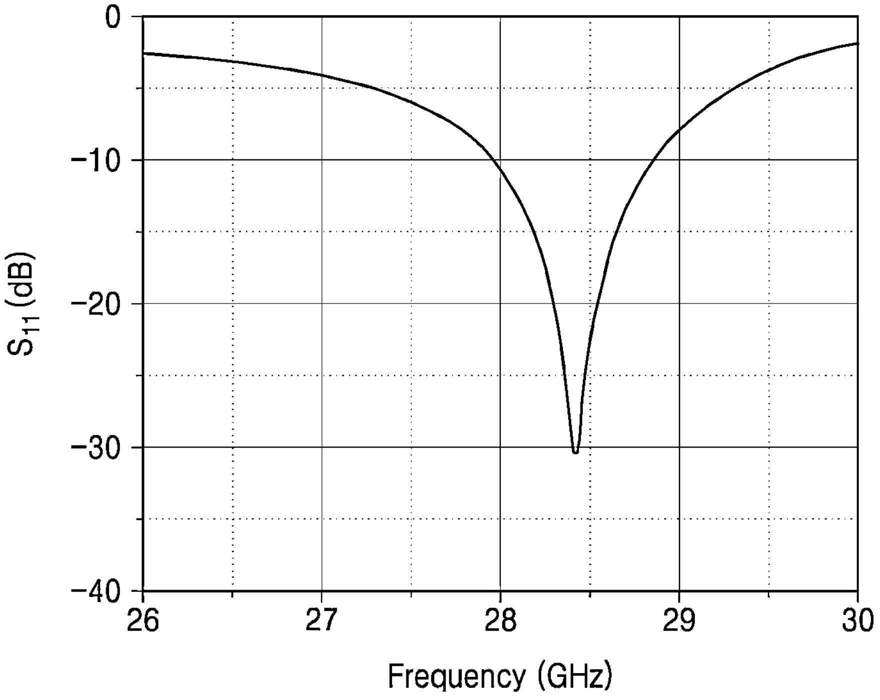

Referring to FIG. 9B, in the fourth experimental example, a resonant frequency was about 28.42 Hz, a bandwidth was about 28.00 GHz to about 28.86 GHZ, and a gain at the resonant frequency measured at a polar angle of 0° was 6.32 dB. Accordingly, it was confirmed that a loss due to the obstacle was compensated by 2.89 dB at the polar angle of 0°.

From the first to fourth experimental examples, it was confirmed that a communication quality deterioration caused by an obstacle such as a user's body was generated in a high frequency environment, and it was confirmed that the communication quality deterioration may be alleviated by employing an FSS. According to some embodiments, by forming an FSS 12 (see FIG. 2) on at least a portion of a transparent substrate TS (see FIG. 2) of the user equipment 10 (see FIG. 2), a communication quality deterioration caused by an obstacle in a mmW communication environment may be prevented.

Figure 10:
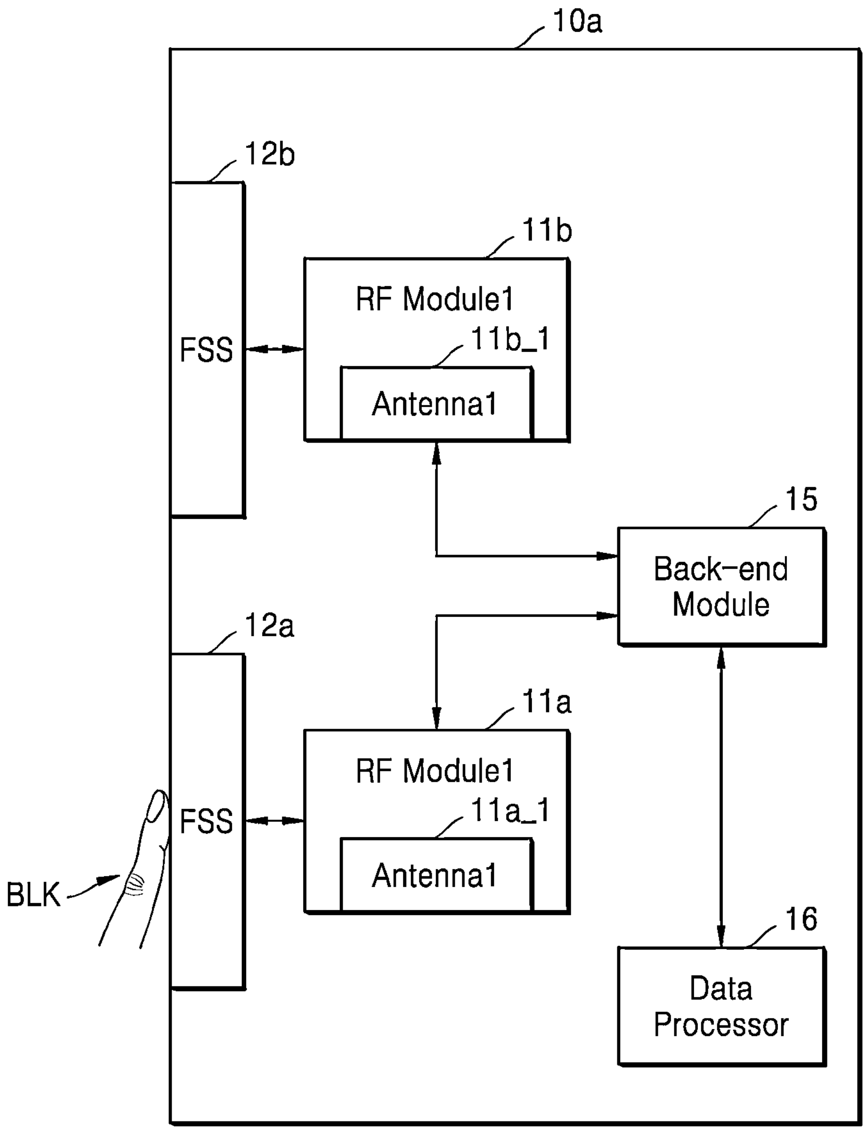
FIG. 10 is a block diagram of user equipment according to some other embodiments.

FIG. 10 is a block diagram of a user equipment 10*a* according to some other embodiments.

Figure 11A:
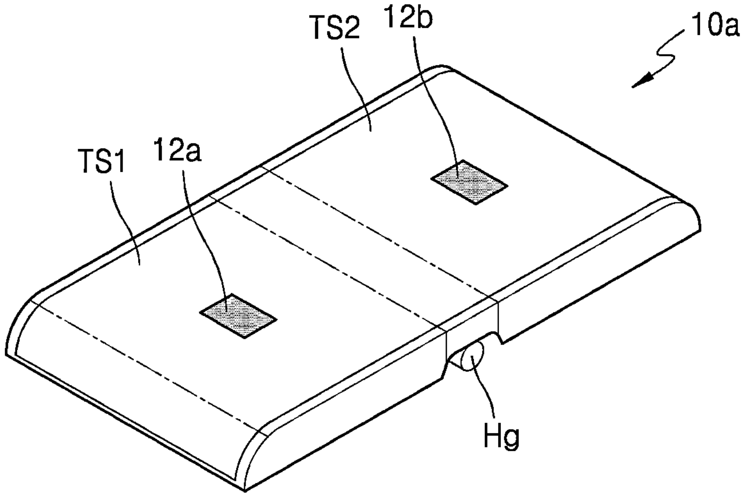
FIGS. 11A and 11B are perspective views of user equipment according to example embodiments.
Figure 11B:
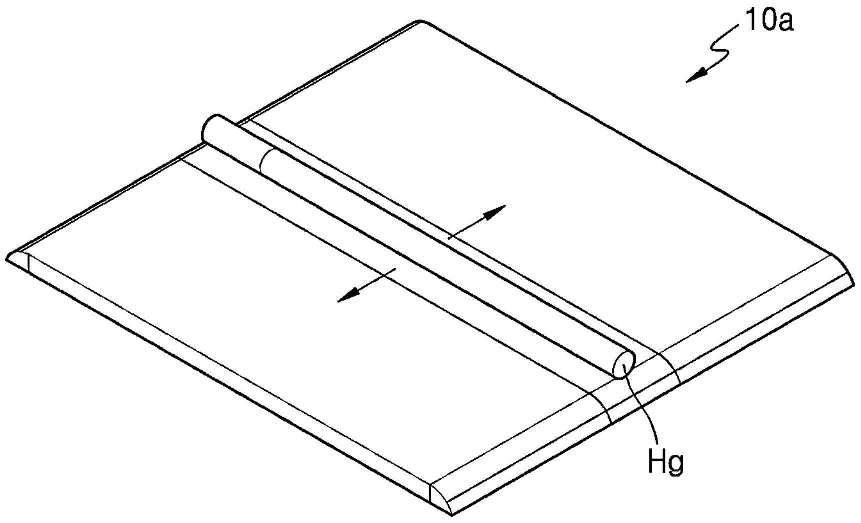

FIGS. 11A and 11B are perspective views of the user equipment 10*a* according to example embodiments.

For convenience of description, descriptions that are the same as those given with reference to FIGS. 1 to 5 will be omitted and differences will be mainly described.

Referring to FIGS. 10 to 11B, unlike the user equipment 10 shown in FIG. 1, the user equipment 10*a* includes first and second RF modules 11*a* and 11*b* including first and second antennas 11*a*_1 and 11*b*_1, respectively, and first and second FSSs 12*a* and 12*b*.

The user equipment 10*a* of FIG. 10 may be, for example, a foldable communication device and may include a hinge Hg that is a bending element. Accordingly, the user equipment 10*a* may include first and second transparent substrates TS1 and TS2, which may be coplanar with each other or may face opposite surfaces, according to a folded state, a first FSS 12*a* formed on the first transparent substrate TS1, and a second FSS 12*b* formed on the second transparent substrate TS2.

According to the example embodiments, the user equipment 10*a* includes first and second FSSs 12*a* and 12*b* corresponding to the first and second antennas 11*a*_1 and 11*b*_1, respectively, opposite to each other. Thus, a surrounding environment (for example, a gripping state of a user) may be detected to transmit and receive signals by using a more advantageous one of the first and second antennas 11*a*_1 and 11*b*_1. Accordingly, communication quality using the user equipment 10*a* may be improved.

Figure 12:
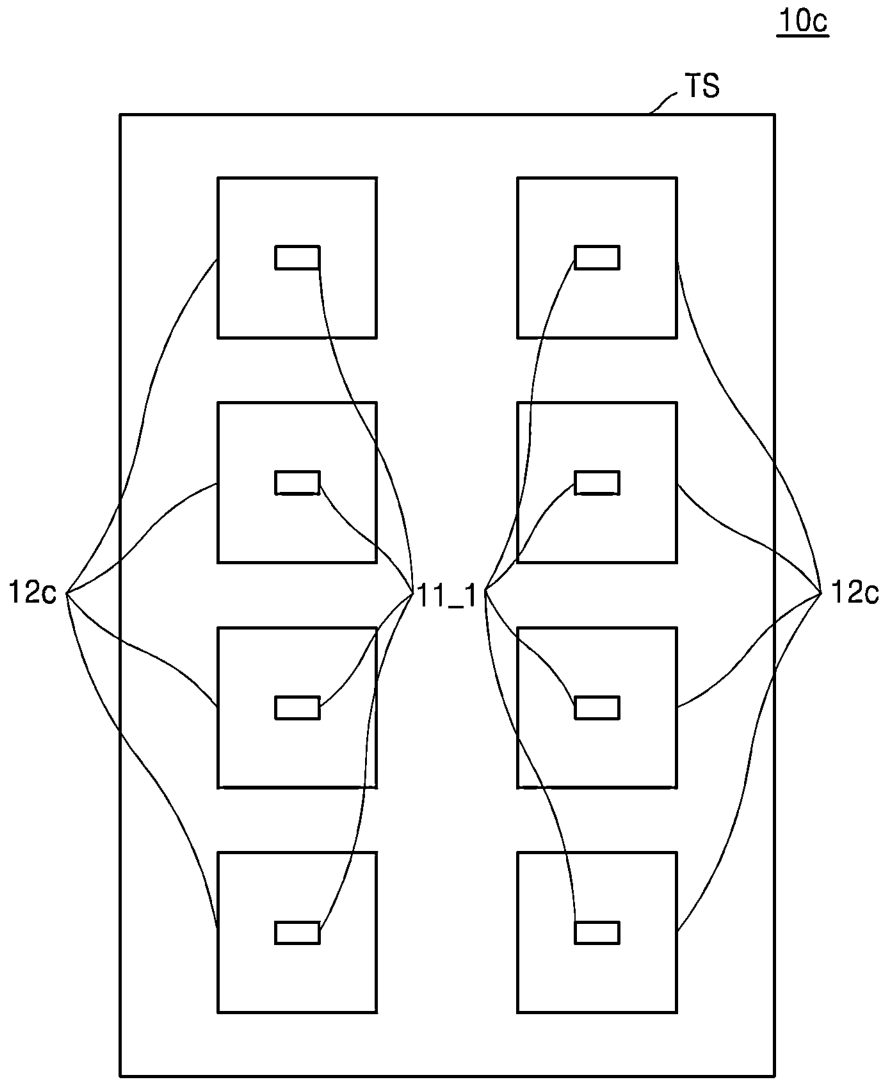
FIGS. 12 and 13 are diagrams for describing user equipment according to other example embodiments.
Figure 13:
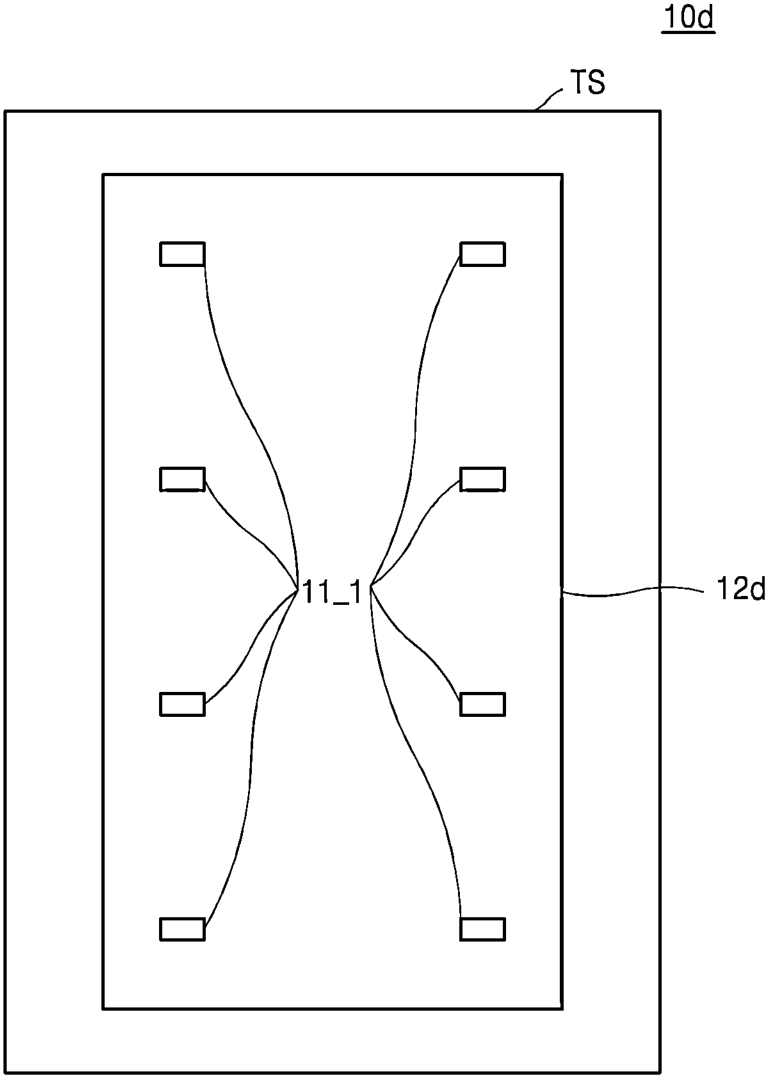

FIGS. 12 and 13 are diagrams for describing user equipments according to other example embodiments.

For the convenience of illustration, in FIGS. 12 and 13, only the layouts of a transparent substrate TS, antennas 11_1, and FSSs 12*c* and 12*d* of user equipments 10*c* and 10*d* are illustrated.

Referring to FIG. 12, the user equipment 10*c* may include a plurality of antennas 11_1 arranged and aligned on the front surface of the transparent substrate TS. The user equipment 10*c* may include a plurality of FSSs 12*c* corresponding to the plurality of antennas 11_1, respectively. In FIG. 12, four rows and two columns of antennas 11_1 and four rows and two columns of FSSs 12*c* corresponding thereto are shown. However, this is an example, and the antennas 11_1 and the FSSs 12*c* may be arranged in any number and with any arrangement.

Referring to FIG. 13, unlike in FIG. 12, an FSS 12*d* having a large area may be formed on the front surface of the transparent substrate TS and thus a plurality of antennas may correspond to one FSS 12*d*.

In the embodiment of FIGS. 12 and 13, in addition to the FSSs 12*c* and 12*d*, a plurality of antennas 11_1 may be provided to transmit and receive signals by using the most advantageous one of the plurality of antennas 11_1. Accordingly, communication quality using the user equipments 10*c* and 10*d* may be improved.

According to the inventive concept, an FSS included in a communication device and a portable terminal may diffract an RF signal of an adjacent antenna to prevent the RF signal of the antenna from being blocked by an obstacle. Accordingly, communication quality may be improved.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A portable terminal comprising:

at least one antenna transmitting a first radio frequency (RF) signal;

a display indicating a processing status of the portable terminal;

a transparent substrate covering the display and the at least one antenna; and a plurality of conductive patterns arranged on the transparent substrate, wherein the plurality of conductive patterns are configured to receive the first RF signal to generate a second RF signal.

2. The portable terminal of claim 1, wherein a width of each of the plurality of conductive patterns is equal to or less than 1/20 of a wavelength of the first RF signal.

3. The portable terminal of claim 1, wherein the plurality of conductive patterns diffract the first RF signal such that the first RF signal avoids an obstacle adjacent to the portable terminal.

4. The portable terminal of claim 1, wherein each of the plurality of conductive patterns resonates with the first RF signal.

5. The portable terminal of claim 1, wherein the at least one antenna is located in a central portion of the transparent substrate.

6. The portable terminal of claim 1, wherein the at least one antenna is located at an edge of the transparent substrate.

7. The portable terminal of claim 1, wherein the at least one antenna comprises a plurality of antennas.

* * * * *